(12) United States Patent
Moon et al.

(10) Patent No.: US 12,130,762 B2
(45) Date of Patent: Oct. 29, 2024

(54) HOST SYSTEM AND DEVICE FOR PERFORMING ENVIRONMENT SETTING BASED ON CONNECTION DIRECTION OF CONNECTOR AND OPERATING METHOD OF HOST SYSTEM

(71) Applicant: SAMSUNG ELECTRONICS CO., LTD., Suwon-si (KR)

(72) Inventors: Junyoung Moon, Suwon-si (KR); Sangmin Lee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 132 days.

(21) Appl. No.: 17/836,829

(22) Filed: Jun. 9, 2022

(65) Prior Publication Data
US 2022/0398205 A1 Dec. 15, 2022

(30) Foreign Application Priority Data

Jun. 14, 2021 (KR) .................. 10-2021-0076992
Mar. 31, 2022 (KR) .................. 10-2022-0040460

(51) Int. Cl.
*G06F 13/38* (2006.01)
*G06F 13/40* (2006.01)
(Continued)

(52) U.S. Cl.
CPC ........ *G06F 13/385* (2013.01); *G06F 13/4068* (2013.01); *G06F 13/4282* (2013.01); *G06F 21/44* (2013.01); *G06F 2213/0042* (2013.01)

(58) Field of Classification Search
CPC ................................................ G06F 13/4282
See application file for complete search history.

(56) References Cited

U.S. PATENT DOCUMENTS 9,396,148 B2    7/2016    Inha et al.
9,606,953 B2    3/2017    Talmola
(Continued)

FOREIGN PATENT DOCUMENTS

CN         109101447 A    12/2018
KR    1020150033361        4/2015

OTHER PUBLICATIONS

Revision: "Universal Serial Bus Type-C cable and connector specification", Aug. 11, 2014, XP055271614, p. 20-22.
(Continued)

*Primary Examiner* — Henry Tsai
*Assistant Examiner* — Juanito C Borromeo
(74) *Attorney, Agent, or Firm* — Fish & Richardson P.C.

(57) ABSTRACT

A host system includes a connector having a structure connected to the device irrespective of a direction. The connector includes a plurality of pins disposed thereon. A connection direction detector is configured to detect a direction in which the device is connected to the host system by detecting a signal from at least one first pin of the plurality of pins. A setting controller is configured to receive, from the device, setting information related to a configuration supported by the device and control a configuration operation on the device based on direction information from the connection direction detection. The host system is configured to perform control such that a function module having a unique function included in the device is selectively enabled based on the setting information and the direction information.

20 Claims, 16 Drawing Sheets

(51) Int. Cl.
     *G06F 13/42*         (2006.01)
     *G06F 21/44*         (2013.01)

(56) References Cited

U.S. PATENT DOCUMENTS

| | | |
|---|---|---|
| 9,852,098 B2 | 12/2017 | Gagne-Keats et al. |
| 10,002,061 B2 | 6/2018 | Chen et al. |
| 10,437,752 B2 | 10/2019 | Xu |
| 2002/0169915 A1 | 11/2002 | Wu |
| 2018/0060270 A1* | 3/2018 | Schnell ............... G06F 13/4022 |
| 2018/0067885 A1* | 3/2018 | Hsieh ........................ G06F 1/22 |

OTHER PUBLICATIONS

European Search Report Dated Oct. 24, 2022 Cited in Corresponding European Patent Application No. 22176402.0.

\* cited by examiner

HOST SYSTEM AND DEVICE FOR PERFORMING ENVIRONMENT SETTING BASED ON CONNECTION DIRECTION OF CONNECTOR AND OPERATING METHOD OF HOST SYSTEM

CROSS-REFERENCE TO RELATED APPLICATIONS

This application is based on and claims priority under 35 U.S.C. § 119 to Korean Patent Application Nos. 10-2021-0076992 filed on Jun. 14, 2021, and 10-2022-0040460, filed on Mar. 31, 2022, in the Korean Intellectual Property Office, the disclosures of which are incorporated by reference herein in their entireties.

BACKGROUND

The disclosure relates to a host system and a device connected to the host system and, more particularly, to a host system and a device that perform environment setting based on a connection direction of a connector and an operating method of the host system.

Electronic devices constituting a data processing system may communicate with each other through various interface standards. As an example, a host system and a device may constitute a data processing system, and as an example of interfaces, the host system and the device may communicate with each other through a universal serial bus (USB) Type-C interface or a USB power delivery (PD) Type-C interface. According to the USB Type-C interface standard, a user may connect the device to the host system regardless of a direction, and as an example, the user may connect a plug of the device to a receptacle of the host system in both directions. The host system may determine various characteristics of the device based on an operation defined in the USB Type-C interface.

However, in general, the host system may detect the connection direction of the device based on matters defined in the USB Type-C interface but may only determine positions of pins through which data is transmitted according to the connection direction of the device, and there is a limit in providing various environments for user satisfaction using the data processing system.

SUMMARY

The disclosure provides a host system and a device that may implement various user environments by utilizing a unique structure of a universal serial bus (USB) Type-C interface.

According to an aspect of the disclosure, there is provided a host system including a connector having a structure connected to the device irrespective of a direction and including a plurality of pins disposed thereon. A connection direction detector is configured to detect a direction in which the device is connected to the host system by detecting a signal from at least one first pin of the plurality of pins. A setting controller is configured to receive, from the device, setting information related to a configuration supported by the device and control a configuration operation on the device based on direction information from the connection direction detector. The host system is configured to perform control such that a function module having a unique function included in the device is selectively enabled based on the setting information and the direction information.

According to another aspect of the disclosure, there is provided an operating method of a host system including: recognizing the device connected through the connector; detecting a direction in which the device is connected to the host system by detecting a signal from at least one first pin of a plurality of pins of the connector; receiving setting information related to a configuration supported by the device through a first control with respect to the device; and controlling a configuration operation on the device through a second control with respect to the device. The second control is performed based on a result of detecting a connection direction of the device and the setting information received from the device. A function module having a unique function provided in the device is controlled to be selectively enabled according to the second control.

According to another aspect of the disclosure, there is provided a universal serial bus (USB) device including a connector having a structure connected to the host system irrespective of a direction and including a plurality of pins disposed thereon. A nonvolatile memory device stores one or more pieces of content information and is configured to provide the one or more pieces of content information to the host system based on a first control from the host system. A function module provides one or more user environments to the host system. An environment setter is configured to set an operating environment of the USB device including an enable control of the function module based on a second control of the host system. The environment setter is configured to disable the function module based on the second control as the USB device is connected to the host system in a first direction and enable the function module based on the second control as the USB device is connected to the host system in a second direction.

BRIEF DESCRIPTION OF THE DRAWINGS

Embodiments of the disclosure will be more clearly understood from the following detailed description taken in conjunction with the accompanying drawings in which.

DETAILED DESCRIPTION OF THE EMBODIMENTS

Hereinafter, embodiments of the disclosure will be described in detail with reference to the accompanying drawings.

Figure 1:
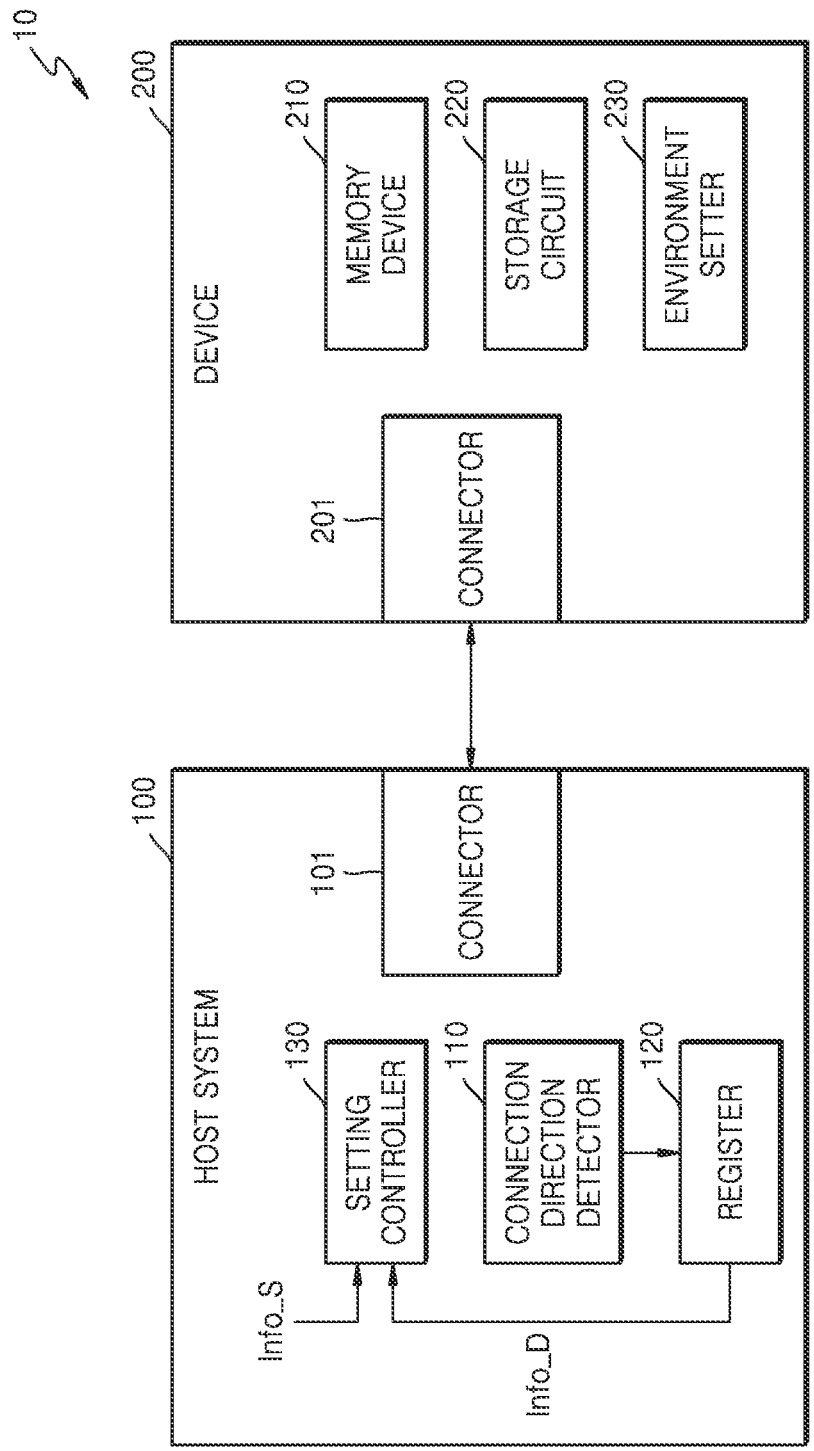
FIG. 1 is a block diagram illustrating a data processing system according to an embodiment of the disclosure.

FIG. 1 is a block diagram illustrating a data processing system 10 according to an embodiment of the disclosure. In FIG. 1, the data processing system 10 includes electronic devices communicating according to a certain interface and the electronic devices may include a host system 100 and a device 200.

The host system 100 and the device 200 may perform communication according to a universal serial bus (USB) Type-C interface standard or a USB power delivery (PD) Type-C interface standard, as a certain interface. In the following embodiments, it will be assumed that the host system 100 and the device 200 perform communication according to the USB Type-C interface. However, embodiments of the disclosure are not necessarily limited thereto, and as a pin structure of a connector has a symmetrical structure in both directions (e.g., up and down and/or left and right), various interfaces that a connector 201 included in the device 200 may be connected to a connector 101 of the host system 100 in both directions may be applied.

Each of the host system 100 and the device 200 may include a connector having a USB Type-C structure, and when the device 200 is connected to the host system 100, the connector 101 provided in the host system 100 may be referred to as a receptacle and the connector 201 provided in the device 200 may be referred to as a plug inserted into the receptacle. According to the USB Type-C interface, the connector 201 of the device 200 may be connected to the connector 101 of the host system 100 regardless of the direction.

The device 200 may be an electronic device that performs various functions, and when performing communication according to the USB Type-C interface, the device 200 may be referred to as a USB device. In addition, the device 200 may include modules that are connected to the host system 100 and provide various functions and, as an example, the device 200 may be a USB device in the form of a memory card that stores content information, such as voice files, image and video files, document files, etc.

The host system 100 is connected to the device 200 through the connector 101, thereby accessing the content information stored in the device 200 and reproducing voice files, image and video files, document files, etc. Also, according to authority granted to the host system 100, the host system 100 may perform various management operations, such as modification and deletion of the content information stored in the device 200. In an implementation example, the host system 100 may include at least one of a TV, a monitor, a portable multimedia player, a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a mobile medical device, a camera, or a wearable device, but embodiments of the disclosure are not necessarily limited thereto.

According to an embodiment of the disclosure, the host system 100 may include a connection direction detector 110, a register 120, and a setting controller 130. Also, the device 200 may include a memory device 210, a storage circuit 220, and an environment setter 230. The memory device 210 may include a nonvolatile memory that stores content information. As an example, the memory device 210 may include a nonvolatile memory, such as NAND flash memory, vertical NAND flash memory, NOR flash memory, resistive random access memory, phase-change memory, magnetoresistive random access memory, etc.

As the connectors 101 and 201 of the data processing system 10 have a USB Type-C structure, the device 200 may be connected to the host system 100 regardless of a connection direction and the connection direction detector 110 may detect the direction in which the device 200 is connected by detecting a signal through at least one pin provided in the connector 101. Also, information (e.g., direction information Info_D) obtained by detecting the connection direction of the device 200 may be stored in the register 120 and the host system 100 may control various configuration operations on the device 200, based on the direction information Info_D stored in the register 120.

Meanwhile, according to matters defined in the USB Type-C interface standard, the host system 100 may receive various types of information related to the device 200 connected through the connector 101. As an example, a configuration operation may be performed during a connection initialization process between the host system 100 and the device 200 and the host system 100 may provide a certain command to the device 200 to perform a first control on the device 200. For example, the first control may include a Get Descriptor operation defined in the USB Type-C interface. The host system 100 may receive various types of information, such as manufacturer and model information, from the device 200 through the Get Descriptor operation and may receive configuration information (or, setting information) related to various operating environments configurable by the device 200. Also, information about various types of interface methods that may be supported in each set operating environment may be provided to the host system 100.

Various types of information related to configuration as described above may be nonvolatilely stored in the device 200, and as an example, the storage circuit 220 may be implemented as a memory, such as read only memory (ROM), and the various types of information may be stored in the storage circuit 220. In the following embodiments, as various types of information provided from the device 200 to the host system 100, information related to a configuration operation on the device 200 may be referred to as setting information Info_S.

In an embodiment of the disclosure, the host system 100 may perform a second control on the device 200 to control configuration of the device 200. For example, the second control may include a set configuration/interface operation defined in the USB Type-C interface. Also, in controlling the configuration, the host system 100 may control the configuration operation of the device 200, based on the setting information Info_S and the direction information Info_D. For example, the device 200 may include a module that performs at least one other function together with a function of storing content information and the host system 100 may perform a control operation so that a user experience utilizing at least one other function of the device 200 may be provided based on the setting information Info_S and the direction information Info_D. For example, when the device 200 includes a wireless communication module (not shown), such as Wi-Fi or Bluetooth, a configuration operation may be performed so that the host system 100 may perform communication through the communication module provided in the device 200, by enabling the communication module provided in the device 200 according to the connection direction of the device 200. That is, a configuration operation may be performed between the host system 100 and the device 200 in the USB Type-C interface. During a configuration operation process, the host system 100 may set a user environment by using various modules provided in the device 200, by utilizing the direction information Info_D indicating the connection direction of the device 200.

In an implementation example, a setting controller 130 of the host system 100 may be implemented as a hardware circuit, in a software manner, or as a combination of hardware and software. For example, the host system 100 may include software (e.g., an application and/or a device driver) controlling a circuit performing hardware communication with the device 200 and the setting controller 130 may be provided in an application in a software manner and/or a device driver. Also, the environment setter 230 of the device 200 may perform configuration operations related to various functions in the device 200, based on the configuration control from the host system 100. As described above, when the device 200 includes a module that performs a separate function, such as a communication module, an operation related to enable setting of the module may be performed.

According to the embodiment of the disclosure as described above, various functions that may be supported by the device 200 based on detection results of the connection direction of the device 200 may be implemented without software manipulation of the user or manipulation of a complicated user interface, and thus, there is an effect of increasing the user application experience.

Figure 2A:
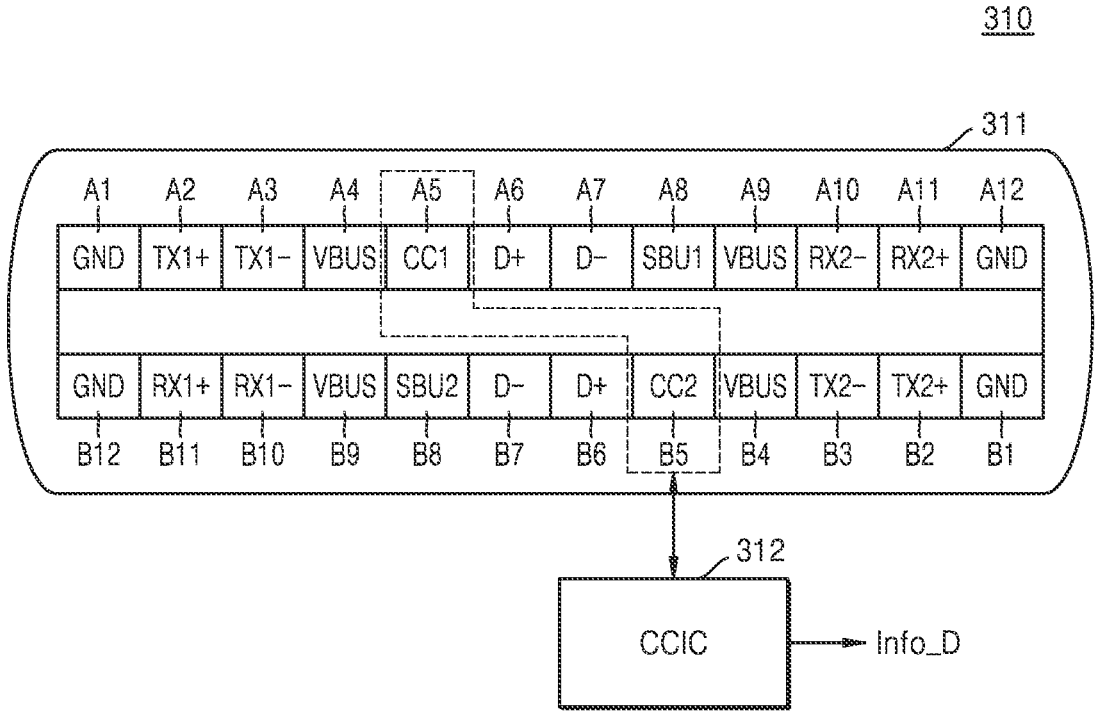
FIGS. 2A and 2B are diagrams illustrating an implementation example of a host system and a device each including a connector of a universal serial bus (USB) Type-C structure.
Figure 2B:
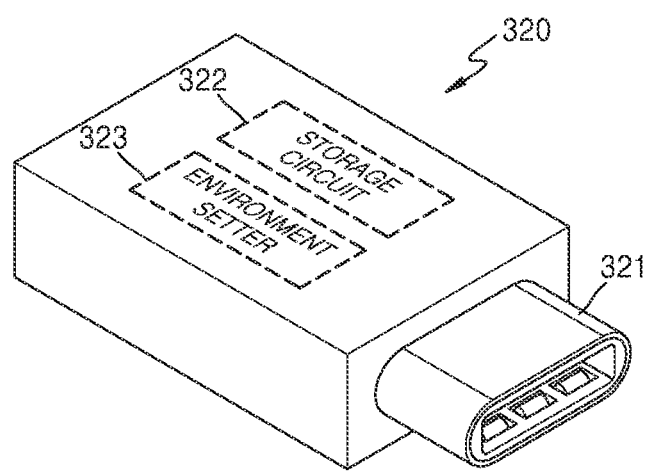

FIGS. 2A and 2B are diagrams illustrating an implementation example of a host system 310 and a device 320 respectively including connectors 311 and 321 of a USB Type-C structure. Because various terms shown in FIGS. 2A and 2B may be easily understood by those skilled in the art through a USB interface standard, detailed descriptions thereof will be omitted.

Referring to the host system 310 of FIG. 2A, pins included in the connector 311 of the host system 310 may have a symmetrical structure. As an example, the connector 311 may include pins A1 to A12 in a first column and pins B1 to B12 in a second column and may support data communication of various speeds. For example, the connector 311 may include pins A2 to A3, A10 to A11, B2 to B3, and B10 to B11 that support high-speed data communication according to a first standard (e.g., USB 3.1), and pins A6 to A7 and B6 to B7 supporting low-speed data communication according to a second standard (e.g., USB 2.0). In addition, each of the pins A1 to A12 in the first column and the pins B1 to B12 in the second column may perform a unique function, and as an example, the VBUS pins A4, A9, B4, B9 may correspond to power supply pins, the GND pins A1, A12, B1, and B12 may correspond to pins that transfer a ground voltage, and the sideband use (SBU) pins A8 and B8 may be used to support an alternate mode (ALT) and be connected to connectors equipped with Thunderbolt, DisplayPort, HDMI, etc.

Also, the host system 310 may perform one-way or two-way communication through the connector 311. As an example, the host system 310 may operate as a host (e.g., a downstream facing port (DFP)) or as a slave (an upstream facing port (UFP)) when connected to an external device through the connector 311. Alternatively, the host system 310 may operate as a dual role port (DRP) and, in this case, the host system 310 may adaptively change a role of the host DFP or the slave UFP.

Meanwhile, in the USB Type-C structure, the connector 311 may include a configuration channel (CC)1 pin and CC2 pin CC1 and CC2 used to identify an external device and the CC1 pin and CC2 pin may correspond to the pins A5 and B5 in the connector 311. When the external device is connected to the connector 311, any one of the CC1 pin and the CC2 pin may have a state connected to a power supply voltage and the other pin may have a state connected (or opened) to a certain pull-down resistor.

The host system 310 may include an integrated circuit connected to the CC1 pin and/or the CC2 pin of the connector 311, and the integrated circuit may be referred to as a configuration channel integrated circuit (CCIC) 312. In the embodiment described above, a connection direction detector that may be provided in the host system 310 may be implemented in the CCIC 312 and the CCIC 312 may recognize connection to the external device based on a voltage state (or a resistance state) connected to the CC1 pin and the CC2 pin and may detect a direction in which a plug of the external device is connected. Also, the CCIC 312 may perform data connection and control based on a result of recognizing the connection of the external device.

According to an embodiment of the disclosure, the CCIC 312 may generate and output the direction information Info_D indicating the connection direction of the external device, and as an example, the direction information Info_D may be stored in an internal or external register of the CCIC 312 and the direction information Info_D stored in the register may be provided to a software layer such as a device driver in the host system 310. In addition, according to an embodiment of the disclosure, the host system 310 may receive various types of information related to the external device and control a configuration operation of the external device based on the direction information Info_D.

Meanwhile, referring to FIG. 2B, the device 320 may include the connector 321 connected to the host system 310, and in the example of FIG. 2B, the connector 321 in the form of a plug inserted into a receptacle of the host system 310 is shown.

According to the embodiment described above, the device 320 may be various types of electronic devices and may be, for example, a memory card including a memory device that stores content information. Furthermore, according to an embodiment of the disclosure, the device 320 may include a storage circuit 322 and an environment setter 323 and the storage circuit 322 may store various types of information provided to the host system 310 according to a Get Descriptor operation based on the USB Type-C interface standard. For example, as described above, the storage circuit 322 may store information related to various types of configurations that may be set in the device 320 along with a device's own information, such as manufacturer and model information of the device 320, and may also store information related to an interface method applicable to each operating environment. In addition, the environment setter 323 may set an operating environment of the device 320 based on setting control from the host system 310 and, as an example, may perform operating configuration of the device 320 according to a set configuration/interface operation by the host system 310 based on the USB Type-C interface standard.

In an embodiment, the device 320 may include a module that performs at least one function as a user environment and the module may be selectively enabled according to a connection direction of the device 320. In an implementation example, although not shown in FIG. 2B, a mark determining the direction of the device 320 may be formed on an outer surface of the device 320, the user may check the mark formed on the outer surface of the device 320, and based on this select the connection direction of the device 320 to connect the device 320 to the host system 310.

For example, when the device 320 includes a communication module, such as a Wi-Fi module, the user may connect the device 320 to the host system 310 in a specific direction (e.g., a first direction) so that the host system 310 may perform communication using the Wi-Fi module included in the device 320. Meanwhile, when the device 320 is to be used for a basic purpose, such as storage of content information, the user may connect the device 320 to the host system 310 in another specific direction (e.g., a second direction). According to an embodiment of the disclosure, the host system 310 may control configuration on the device 320 based on the setting information related to the configuration read from the device 320 together with direction information indicating the connection direction of the device 320.

Figure 3:
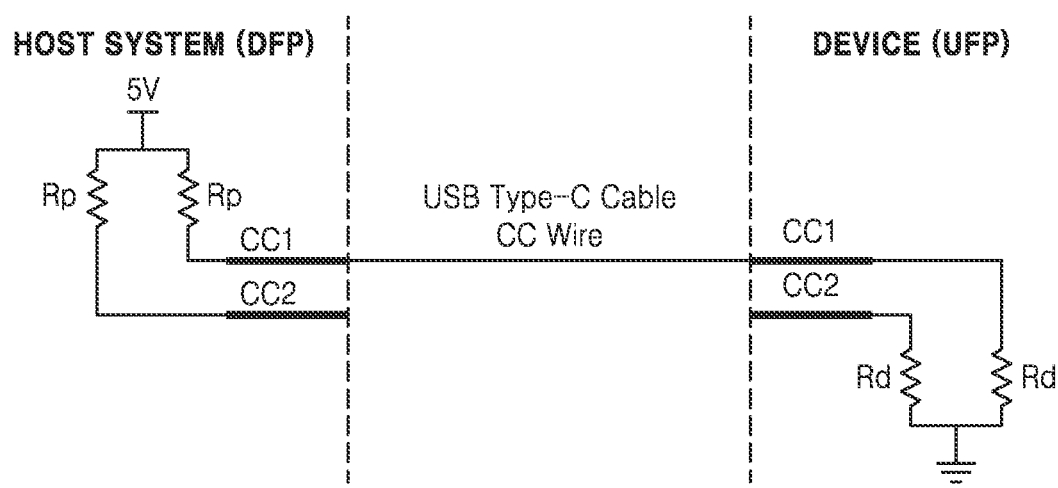
FIG. 3 is a circuit diagram illustrating a resistance connection state of configuration channel (CC) pins of a connector of a USB Type-C structure.

FIG. 3 is a circuit diagram illustrating a resistance connection state of CC pins of a connector of a USB Type-C structure. As an example, when a device is connected to a host system, the host system operates as a host (e.g., a DFP) and the device operates as a slave (a UFP).

A pull-down resistor Rd having a previously agreed resistance value may be connected to the CC pin of the device. When the device is connected to the host system, either of the CC1 pin and CC2 pin of the host system may be selectively connected to the pull-down resistor Rd of the device according to a connection direction of the device. As an example, the CC pin of the host system may be connected to a certain power supply voltage (e.g., a power supply voltage of 5 V) through a pull-up resistor Rp having a previously agreed resistance value. In the example of FIG. 3, the CC1 pin of the host system is connected to the pull-down resistor Rd of the device.

The host system may detect the connection direction of the device based on a voltage level detected through the CC1 pin or the CC2 pin. As an example, the host system may detect an open state of the CC2 pin, while detecting a voltage level of a node between the pull-up resistor Rp and the pull-down resistor Rd connected in series between the supply voltage of 5 V and a ground voltage from the CC1 pin, and detect the connection direction of the device based on the voltage level. That is, in the embodiment of the disclosure, the connection direction of the device may be detected by determining which of the CC1 pin and CC2 pin of the host system is connected to the pull-down resistor Rd of the device.

Figure 4:
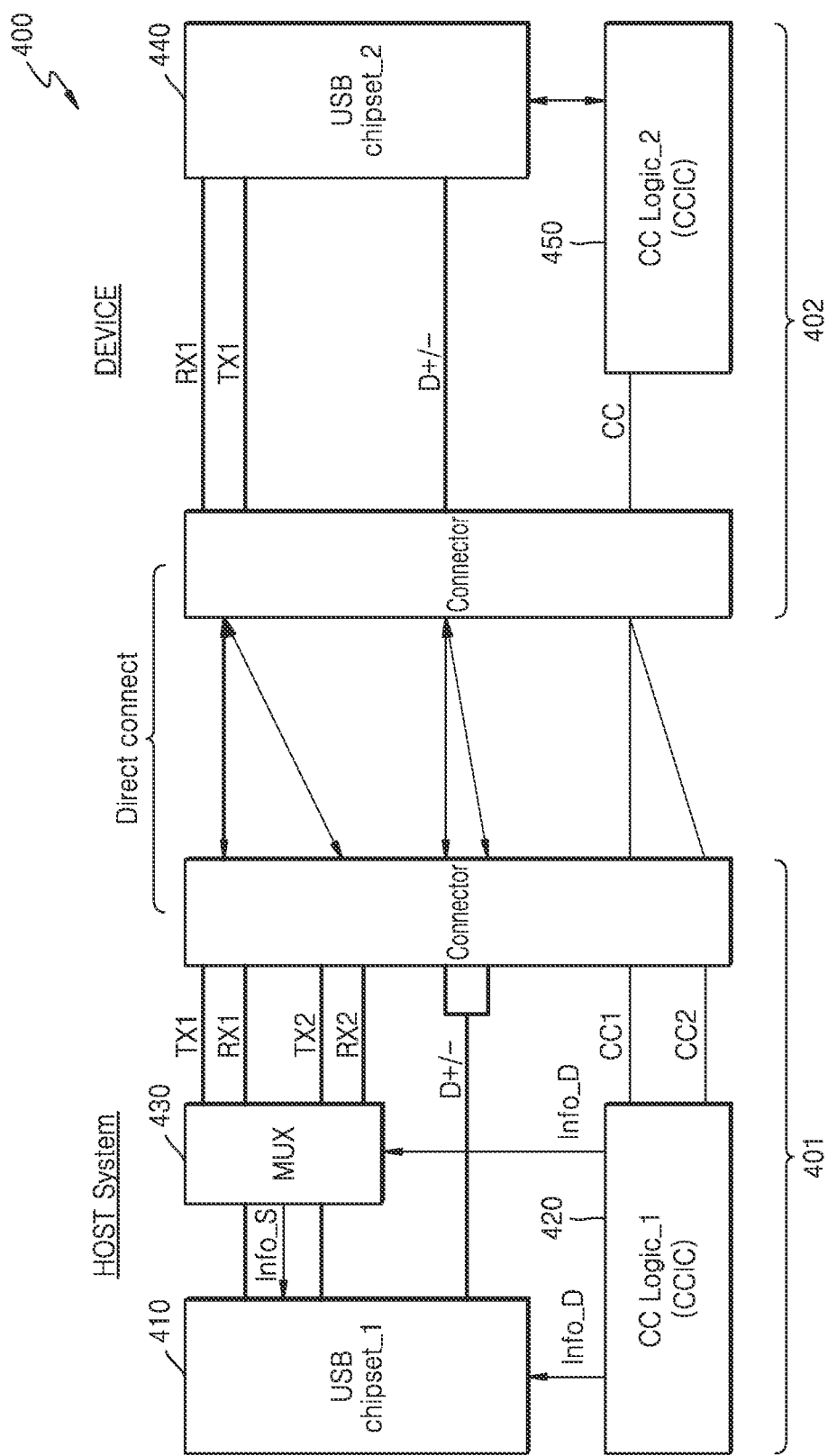
FIG. 4 is a block diagram illustrating an example of a USB Type-C interface-based communication according to an embodiment of the disclosure.

FIG. 4 is a block diagram illustrating an example of a USB Type-C interface-based communication according to an embodiment of the disclosure.

Referring to FIG. 4, a data processing system 400 may include a host system 401 and a device 402 and the host system 401 and the device 402 may be interconnected through a connector of a USB Type-C structure. As in the above embodiment, the host system 401 and the device 402 may be directly connected to each other through a receptacle and plug structure and any one of two data transfer paths may be selected according to a connection direction of the device 402.

For example, each of the host system 401 and the device 402 may include a semiconductor chip that performs mutual communication based on the USB Type-C interface and, as an example, a first USB chipset 410 provided in the host system 401 and a second USB chipset 440 provided in the device 402. Each of the first USB chipset 410 and the second USB chipset 440 may include a circuit and a software layer performing hardware communication according to the embodiment described above.

The second USB chipset 440 may communicate data with the host system 401 through at least one pin of the connector and, as an example, through an RX1 pin and a TX1 pin supporting high-speed data communication according to the first standard (e.g., USB 3.1). Also, the second USB chipset 440 may communicate data with the host system 401 through D+ and D− pins that support low-speed data communication according to the second standard (e.g., USB 2.0).

In addition, the host system 401 and the device 402 may perform communication through the CC pin to recognize interconnection and may each include CC logic (e.g., CCIC) to perform a related operation. As an example, the host system 401 may include a first CC logic 420, the device 402 may include a second CC logic 450, and the second CC logic 450 may be connected to the host system 401 through a specific CC pin (e.g., the CC1 pin or the CC2 pin).

According to an embodiment of the disclosure, the device 402 may be connected to the host system 401 according to a first direction or a second direction, and the first CC logic 420 of the host system 401 may detect a connection direction of the device 402 by detecting a CC pin connected to a pull-down resistor of the device 402 among the CC1 pin and the CC2 pin. Also, the first CC logic 420 may generate the direction information Info_D based on detecting results of the connection direction and provide the direction information Info_D to a multiplexer 430 provided in the host system 401.

According to the connection direction of the device 402, the host system 401 may perform high-speed data communication with the device 402 through the RX1 and TX1 pins or perform high-speed data communication with the device 402 through RX2 and TX2 pins. The multiplexer 430 may connect the first USB chipset 410 to the RX1 and TX1 pins or connect the first USB chipset 410 to the RX2 and TX2 pins through a switching operation based on the direction information Info_D. That is, the host system 401 may perform high-speed data communication through the RX1 and TX1 pins or high-speed data communication through the RX2 and TX2 pins based on the switching operation of the multiplexer 430 according to the connection direction of the device 402.

Meanwhile, according to an embodiment of the disclosure, as the direction information Info_D is provided to the first USB chipset 410, the direction information Info_D may be utilized in an application layer of the host system 401 and the setting information Info_S related to the configuration provided from the device 402 may be provided to the first USB chipset 410. In the example shown in FIG. 4, the first USB chipset 410 receives the setting information Info_S through high-speed data communication, but the setting information Info_S may be provided to the first USB chipset 410 through low-speed data communication by the D+ and D− pins.

According to an embodiment of the disclosure, the first USB chipset 410 may control various configuration operations on the device 402, based on the direction information Info_D and the setting information Info_S. For example, when the device 402 includes one or more modules for other functions (e.g., a Wi-Fi communication function) in addition to a function of storing content information, various types of configurations supportable by the device 402 and information related to the interface may be included in the setting information Info_S and the first USB chipset 410 may perform a control operation for a configuration corresponding to the direction information Info_D.

Figure 5:
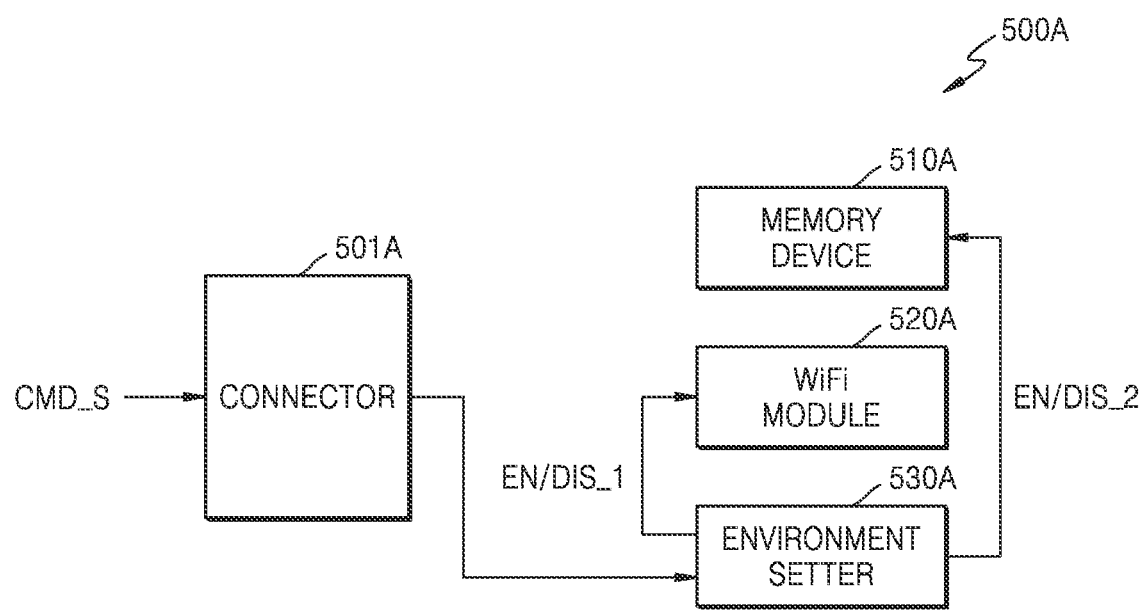
FIGS. 5 and 6 are block diagrams illustrating implementation examples of devices according to embodiments of the disclosure.
Figure 6:
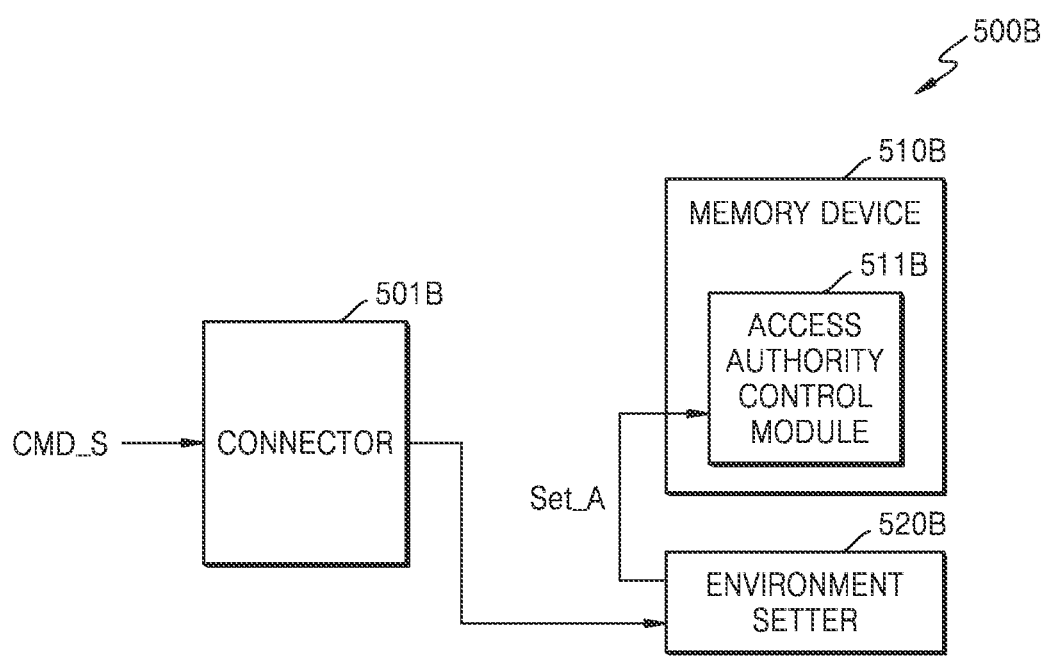

FIGS. 5 and 6 are block diagrams illustrating implementation examples of devices 500A and 500B respectively according to embodiments of the disclosure. In FIGS. 5 and 6, a Wi-Fi module and an access authority control module are modules implemented in the devices 500A and 500B, but in embodiments of the disclosure various modules connected to a user PC, TV, or smartphone to provide various types of user environments may be provided in the devices 500A and 500B. Also, a device that communicates with a host system based on a USB Type-C interface may be referred to as a USB device.

Referring to FIG. 5, the device 500A may include a connector 501A, a Wi-Fi module 520A, and an environment setter 530A and when the device 500A is implemented in the form of a memory card, the device 500A may further include a memory device 510A. The device 500A may provide content information stored in the memory device 510A to a host system through the connector 501A and, as the host system performs a set configuration/interface operation based on the USB Type-C interface, receive a setting command CMD_S from the host system.

The environment setter 530A may set various operating environments in the device 500A in response to the setting command CMD_S from the host system. For example, as the device 500A includes the Wi-Fi module 520A, the environment setter 530A may output a first enable/disable signal EN/DIS_1 in response to the setting command CMD_S, and accordingly, the Wi-Fi module 520A may be enabled or disabled. The host system may internally activate components for data transmission and reception processing through Wi-Fi communication as a direction in which the device 500A is connected is detected, and the host system may perform wireless communication with an electronic device outside a data processing system through the Wi-Fi module 520A as the Wi-Fi module 520A of the device 500A is enabled.

As an example of operation, the environment setter 530A may output a second enable/disable signal EN/DIS_2 for enabling the memory device 510A in response to the setting command CMD_S. In an example of operation, when the Wi-Fi module 520A of the device 500A is enabled, access to content information stored in the memory device 510A may be blocked as the memory device 510A is disabled and, accordingly, the device 500A may perform only a function of the Wi-Fi module 520A. Alternatively, as the memory device 510A and the Wi-Fi module 520A are enabled together, information received from an external electronic device may be stored in the memory device 510A or content information stored in the memory device 510A may be transmitted to the external electronic device through the Wi-Fi module 520A.

Referring to FIG. 6, as the device 500B is implemented in the form of a memory card, the device 500B may include a memory device 510B and an environment setter 520B and the memory device 510B may include an access authority control module 511B. Similar to the embodiment shown in FIG. 5, the device 500B may provide the content information stored in the memory device 510B to the host system through a connector 501B and also receive the setting command CMD_S instructing a setting of the operating environment from the host system through the connector 501B.

A user may need security of the content information stored in the device 500B, and as an example, when the device 500B is connected to the user PC or TV, may wish to prevent the content information stored in the device 500B from being leaked to the outside by a security attack from the outside. In this regard, when the user connects the device 500B to the host system, the user may connect the device 500B to the host system in a specific direction so that a security function is enabled and the host system may provide the set command CMD_S to the device 500B based on a connection direction of the device 500B.

The environment setter 520B may provide authority setting information Set_A to the access authority control module 511B of the memory device 510B in response to the setting command CMD_S, and access to the content information stored in the memory device 510B may be restricted according to the setting of the access authority control module 511B. For example, the access authority to the memory device 510B may be set in various forms, and as an example, specific content information may be reproduced by the host system as the content information is provided to the host system, whereas the transmission of content information requiring security to the host system may be blocked. Alternatively, although not shown in FIG. 6, the device 500B may include a Wi-Fi module and the content information stored in the memory device 510B may be provided to a physically connected host system according to the setting of the access authority control module 511B, whereas the access authority may be set so that the transmission of content information is blocked through communication based on other wired/wireless methods, such as Wi-Fi communication.

According to the embodiment of the disclosure as described above, in a data processing system including a host and a device, various functions may be implemented in an application layer according to a connection direction of the device and there is an effect of increasing the user experience through access blocking of content information, transmission of content information to other electronic devices through wired/wireless communication, implementation of Wi-Fi communication through a device connection, etc.

Figure 7:
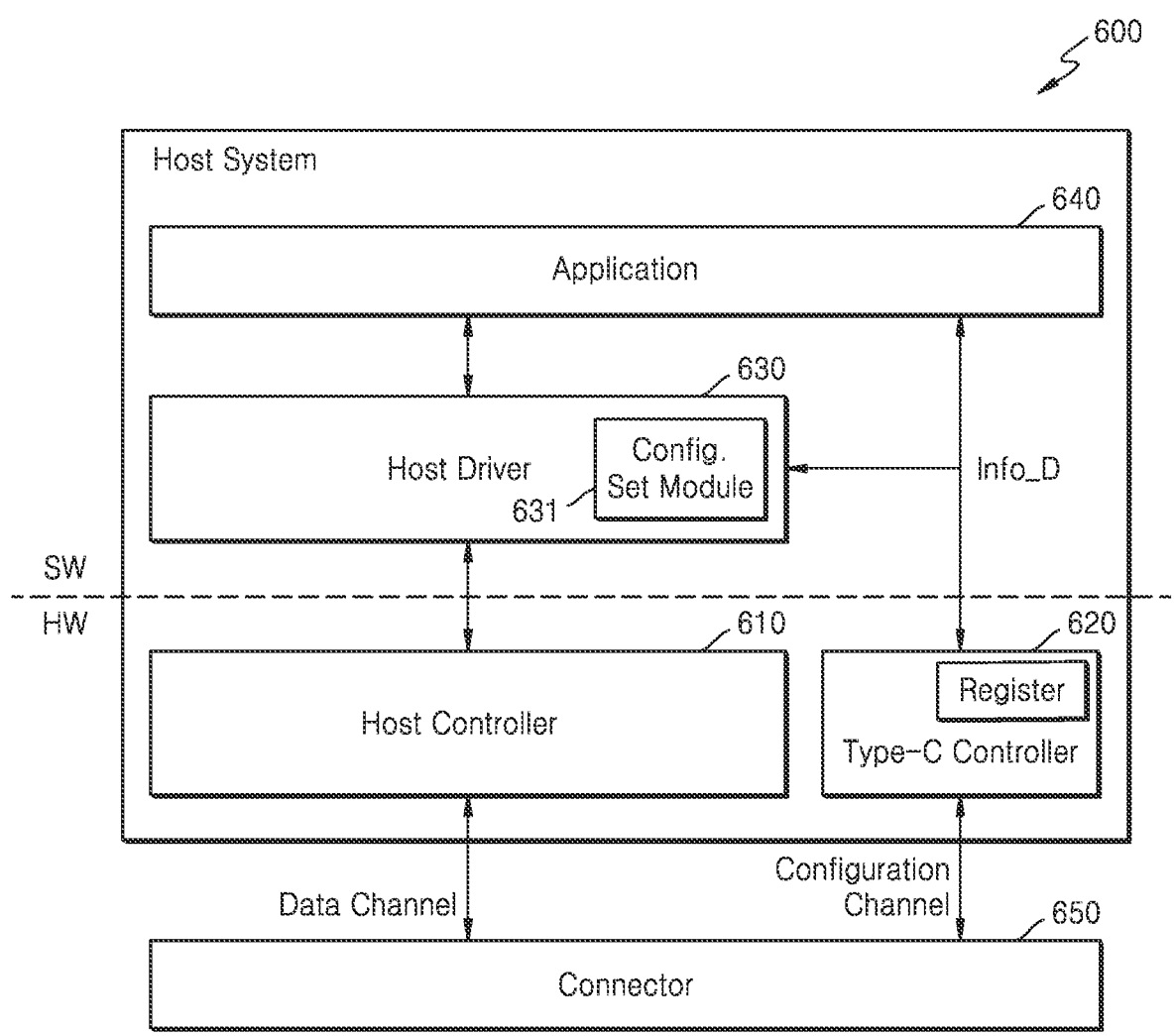
FIG. 7 is a block diagram illustrating an implementation example of a host system according to an embodiment of the disclosure.

FIG. 7 is a block diagram illustrating an implementation example of a host system 600 according to an embodiment of the disclosure.

Referring to FIG. 7, the host system 600 may include various components constituting the host system 600 together with a connector 650 of a USB Type-C structure. The host system 600 may be implemented based on a combination of hardware circuits and software. As an example, the host system 600 may include a host controller 610, a Type-C controller 620, a host driver 630, and an application 640 (or an application layer). In an implementation example, the host controller 610 and the Type-C controller 620 may be implemented as hardware circuits and the host driver 630 and the application 640 may be implemented as software executable by a processor.

The host system 600 may communicate with a device connected to the connector 650, transmit/receive data to/from the device through a data channel connected to a data pin, and communicate with the device through a configuration channel connected to a CC pin (e.g., a CC1 pin and a CC2 pin) to perform connection and recognition on the device. The Type-C controller 620 may correspond to a CCIC in the embodiment described above and detect a connection direction of the device through the configuration channel. In addition, the direction information Info_D according to detecting results may be stored in a register inside the Type-C controller 620, and the direction information Info_D may be transferred to a software layer of the host system 600 to be used for the configuration of the device. For example, the direction information Info_D may be provided to the host driver 630 and/or the application 640.

The host controller 610 may perform communication with the device by using hardware through the connector 650 and perform various control operations on the device connected to the connector 650. For example, the host controller 610 may be a hardware controller for a USB host and may transmit/receive at least one piece of information to/from the Type-C controller 620. As an example, the host controller 610 may recognize a connection of the device, based on information of the Type-C controller 620. Also, the host controller 610 may transmit/receive various types of information to and from the device through a data channel and may recognize various types of information related to the device, based on the information provided from the device. For example, the host controller 610 may recognize a speed of the device, generate a USB packet, transmit the generated USB packet to the device, and perform various control operations on a flow related to communication with the device.

Meanwhile, the application 640 may include various types of software accessing the device in a data processing system and may determine a specific setting or function with respect to the device. Also, the host driver 630, which is software controlling the host controller 610, may convert various requests and data from the application 640 into a format corresponding to the device and provide the converted requests and data to the host controller 610. In an embodiment of the disclosure, the direction information Info_D may be provided to the application 640 and/or the host driver 630 and when determining the specific setting or function with respect to the device, the direction information Info_D may be used Meanwhile, when data converted into a specific format by the host driver 630 is stored in a certain memory (e.g., double data rate (DDR) DRAM) in the host system 600, the host controller 610 may read data stored in the memory based on location information provided from the host driver 630, convert the read data to correspond to a USB interface standard, and perform communication with the device based on the USB interface standard. Also, the host controller 610 may perform a processing operation on an error in communication with the device, and as an example, a packet retransmission request may be performed by the host controller 610.

In an example of operation, the host system 600 may receive various types of information from the device through a Get Descriptor operation, based on the USB interface standard. For example, the device may store various types of information related to configuration therein and, in response to the Get Descriptor operation, transmit various types of information, such as a manufacturer, a model, and a function of the device, to the host system 600 and also transmit information related to various types of configurations supported by the device and information about various types of interfaces applicable to the host system 600 in response to each configuration. In embodiments of the disclosure, when the device provides various functions, such as Wi-Fi communication and content access authority setting in relation to a user environment, related information may be provided to the host system 600 through the Get Descriptor operation.

The application 640 and/or the host driver 630 may determine the specific setting or function with respect to the device based on a combination of the information related to the device received through the Get Descriptor operation and the direction information Info_D. For example, according to the embodiments described above, functions provided by the device may be selectively enabled based on a connection direction of the device, and as an example, a Wi-Fi module may be enabled or disabled according to the connection direction of the device. Alternatively, access authority with respect to content information may be differently set according to the connection direction of the device.

Based on the control of the application 640 and/or the host driver 630 as described above, the configuration with respect to the device or the interface setting may be controlled, and as an example, the host system 600 may control the above-described configuration and interface setting through a set configuration/interface operation based on the USB interface standard.

Figure 8:
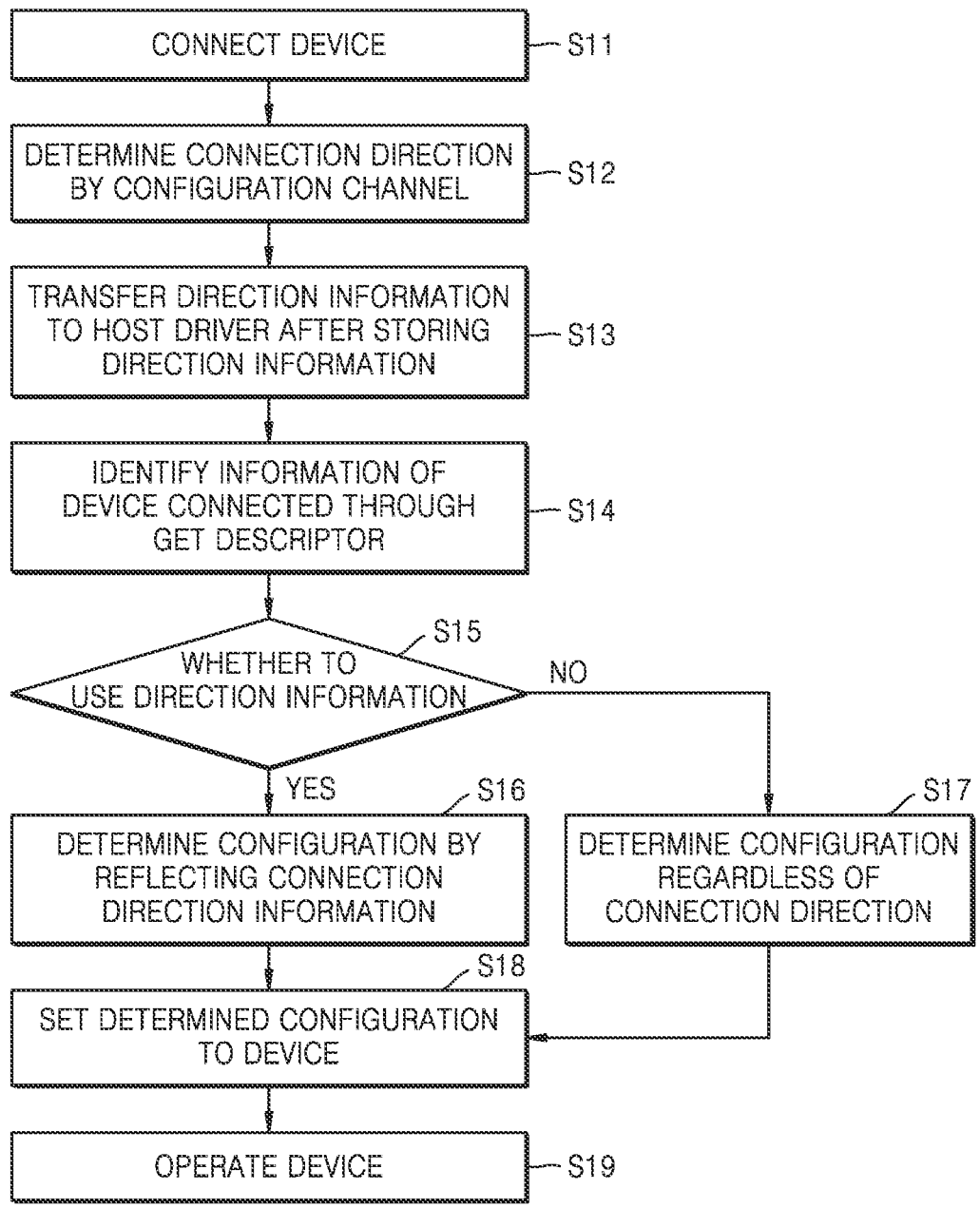
FIG. 8 is a flowchart illustrating an operating method of a data processing system according to an embodiment of the disclosure.

FIG. 8 is a flowchart illustrating an operating method of a data processing system according to an embodiment of the disclosure. The operating method shown in FIG. 8 may include an operating method of a host system and an operating method of a device according to an embodiment of the disclosure.

Referring to FIG. 8, the device may be connected to the host system through a connector of a USB Type-C structure (S11) and the host system may determine a connection direction of the device through a configuration channel connected to CC pins (CC1 pin and CC2 pin) (S12).

Direction information indicating the connection direction of the device, determined by the host system, may be stored in a register in the host system, and the stored direction information may be transmitted to a software layer of the host system. For example, the direction information may be provided to a host driver (S13). In addition, the host system may identify various types of information related to the device through a Get Descriptor operation on the device (S14) and may determine whether to use the direction information of the device in performing configuration and interface setting with respect to the device (S15).

In an embodiment, whether to use the direction information of the device may be determined in various ways. For example, the host system may determine whether the device supports additional functions for a user environment based on information received through the Get Descriptor operation, and when a module for additional functions is disposed in the device, may determine that direction information is used. Alternatively, a setting operation on determining whether to use the direction information of the device in the host system may be performed, and even if modules related to additional functions are provided to the device, the direction information of the device may be used selectively based on the information set in the host system.

According to determination results, when the direction information of the device is not used, the host system may determine the configuration with respect to the device regardless of a connection direction of the device (S17). Meanwhile, when the direction information of the device is used, the host system may determine the configuration by reflecting the connection direction information of the device among various operating environments supportable by the device (S16). According to the above processes, the configuration with respect to the device may be finally determined and, accordingly, the configuration with respect to the device may be performed through the set configuration/interface operation (S18), and thereafter, a normal operation between the host system and the device may be performed (S19).

FIGS. 9 to 12 are block diagrams illustrating a data processing system according to various embodiments of the disclosure. In describing the embodiments shown in FIGS. 9 to 12, detailed descriptions of the same components as those shown in FIG. 7 will be omitted.

Figure 9:
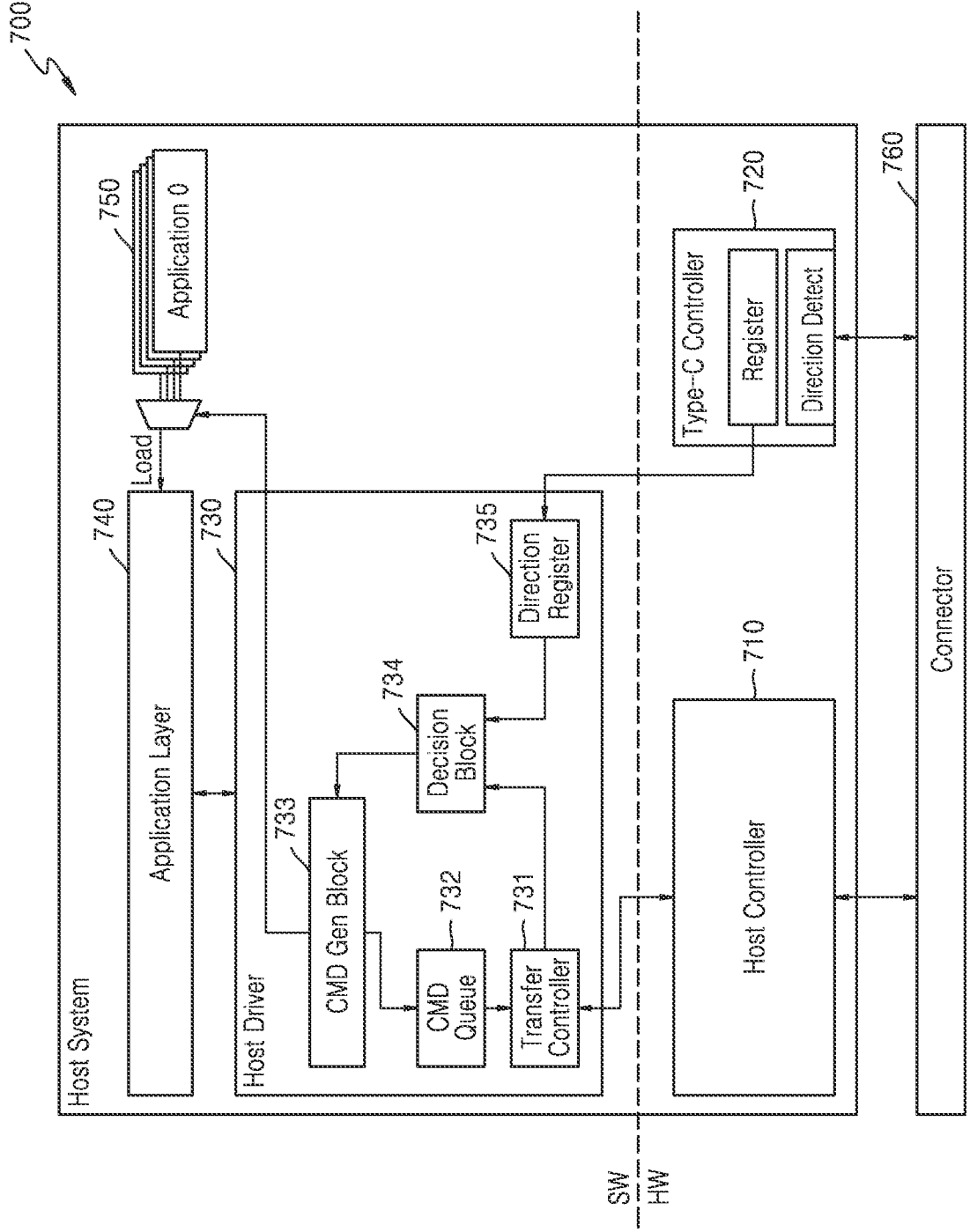
FIGS. 9 to 12 are block diagrams illustrating a data processing system according to various embodiments of the disclosure.

Referring to FIG. 9, a host system 700 may include a host controller 710, a Type-C controller 720, a host driver 730, and an application layer 740 and may further include various types of applications 750 that may be loaded on the application layer 740 and a connector 760 according to the embodiments described above. In addition, the host controller 710 may include hardware circuits and may include, for example, a direction detector and a register.

Meanwhile, the host driver 730 may be included in a software layer and may include a transfer controller 731, a command queue 732, a command generation block 733, a decision block 734, and a direction information register 735. The transfer controller 731 may control a transfer path of information in transmission/reception of information with the host controller 710, the direction information register 735 may store direction information from the Type-C controller 720, and the decision block 734 may decide a configuration with respect to a device based on setting information from the device and a connection direction of the device according to the embodiments described above.

The command generation block 733 may generate commands for controlling various configurations with respect to the device and may also control a loading operation of an application based on a decision result of the decision block 734. As an example, the device may include various types of function modules and the host system 700 may include various types of applications for utilizing function modules included in the device. An application to be loaded into the application layer 740 may be selected based on the control of the command generation block 733.

Commands generated by the command generation block 733 may be stored in the command queue 732 and may be provided to the device through the transfer controller 731 and the host controller 710 according to a certain timing. According to the embodiments described above, Get Descriptor and Set Configuration/interface operations for receiving various configuration information and controlling a configuration with respect to the device may be performed based on a command transfer.

Figure 10:
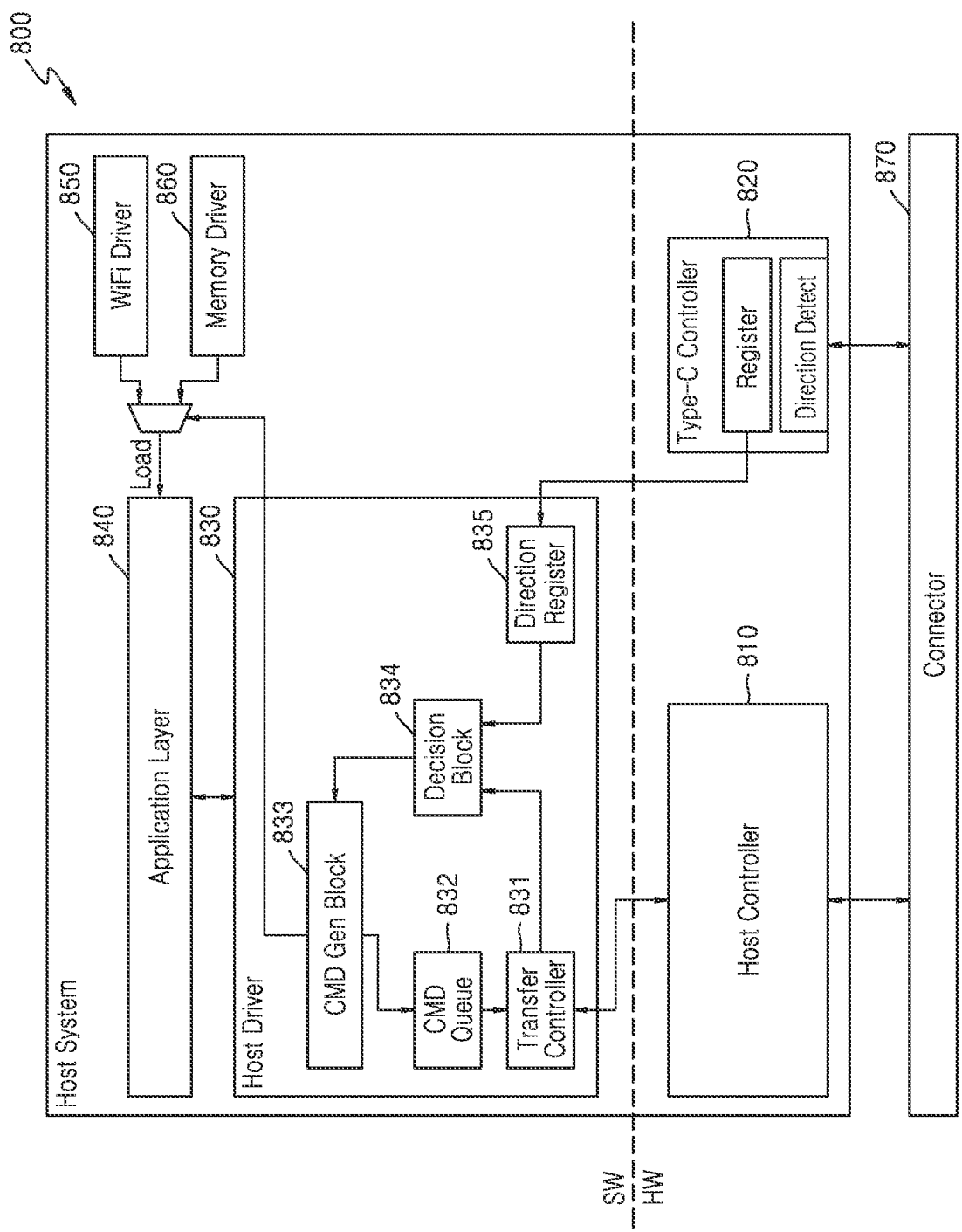

Meanwhile, referring to FIG. 10, a host system 800 may include a host controller 810, a Type-C controller 820, a host driver 830, an application layer 840, and a connector 870 and, in addition, may further include a Wi-Fi driver 850 and a memory driver 860 as various types of applications. In addition, the host driver 830 may include a transfer controller 831, a command queue 832, a command generation block 833, a decision block 834, and a direction information register 835.

The device may be implemented as a memory card including a memory device, and when a communication module (e.g., a Wi-Fi module) is included in the device according to an embodiment of the disclosure, the host system 800 may include an application for driving a Wi-Fi module and a memory device. In addition, according to an embodiment of the disclosure, when the Wi-Fi module is enabled when the device is connected in a specific direction, the Wi-Fi driver 850 may be selectively loaded into the application layer 840 based on the control of the host driver 830 or the command generation block 833, and accordingly, a wireless communication function may be provided to a user environment.

Figure 11:
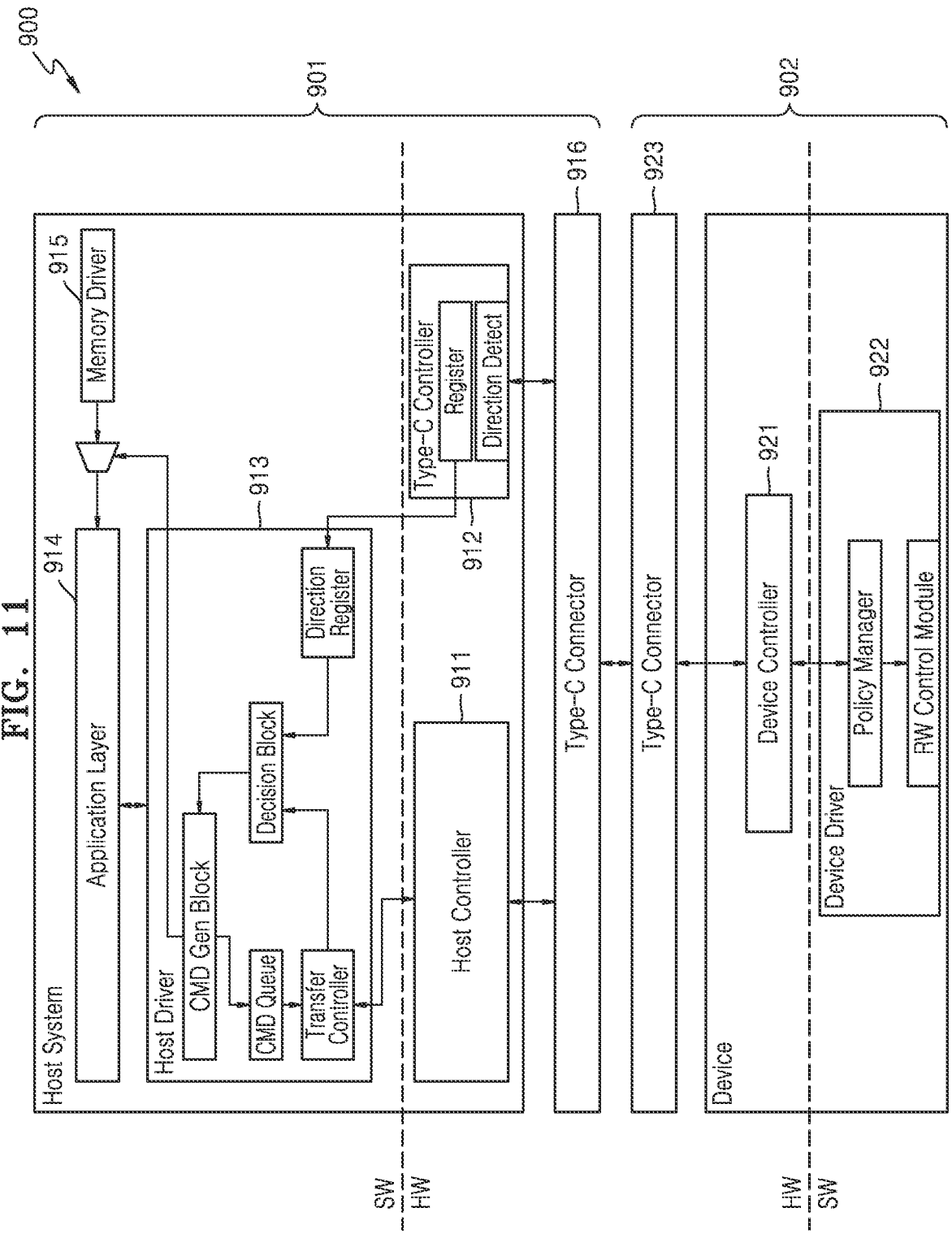

Meanwhile, referring to FIG. 11, a data processing system 900 may include a host system 901 and a device 902, and the host system 901 may include a host controller 911, a Type-C controller 912, a host driver 913, an application layer 914, and a connector 916 and may further include a memory driver 915 as various types of applications. In addition, the host driver 913 may include a transfer controller, a command queue, a command generation block, a decision block, and a direction information register. Meanwhile, the device 902 may include a device controller 921, a connector 923, and a device driver 922. In an implementation of the device 902, the device controller 921 may be included in a hardware layer and the device driver 922 may be included in a software layer.

According to the embodiments described above, an access authority to a memory device (not shown) included in the device 902 may be controlled based on a decision result of the decision block of the host driver 913. When the device 902 is connected to the host system 901 in a first direction, only a read operation on content information stored in the memory device is possible, and when the device 902 is connected to the host system 901 in a second direction and new content information is further stored in the memory device, the device 902 may differently set access authority with respect to the memory device according to a configuration control from the host system 901.

As an example, according to configuration control from the host system 901, the device driver 922 may differently set access authority with respect to the memory device through a policy manager, and the policy manager may set access authority (e.g., permission to record new content information, etc.) with respect to the memory device by controlling a read/write control module.

Figure 12:
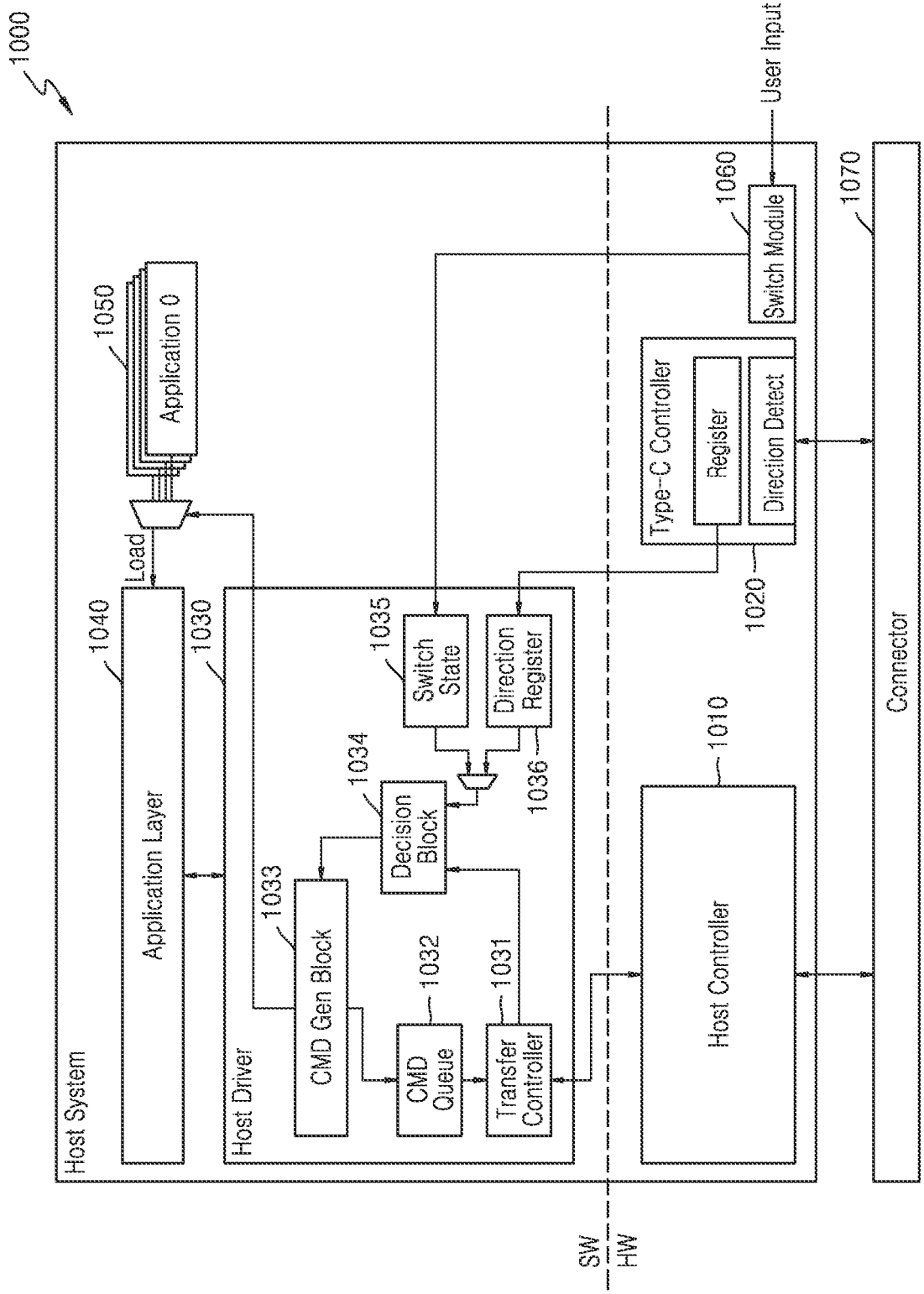

Meanwhile, referring to FIG. 12, a host system 1000 may include a host controller 1010, a Type-C controller 1020, a host driver 1030, an application layer 1040, various types of applications 1050, and a connector 1070 and may further include a switch module 1060 to enable various controls in relation to a user environment, such as enabling of a function module of the device. In addition, the host driver 1030 may include a transfer controller 1031, a command queue 1032, a command generation block 1033, a decision block 1034, a switch state information register 1035, and a direction information register 1036. The switch module 1060 may be implemented as a hardware configuration, such as a physical button, as various types of components capable of receiving a user input or may be implemented as a software configuration, such as being selected on a screen by a user, and the switch state information register 1035 may store information indicating a switch state according to the user input.

In an embodiment, whether to use the user environment according to the connection direction of the device may be determined further based on the user input. For example, when the user intends to use a unique function of the device, such as reproduction of content information, regardless of a connection direction, the user input may be provided to the host system 1000 to be in a switch off state. Accordingly, the decision block 1034 of the host system 1000 may decide whether to enable other functional modules, such as a communication module, which may be included in the device by utilizing switch state information together with direction information.

Figure 13:
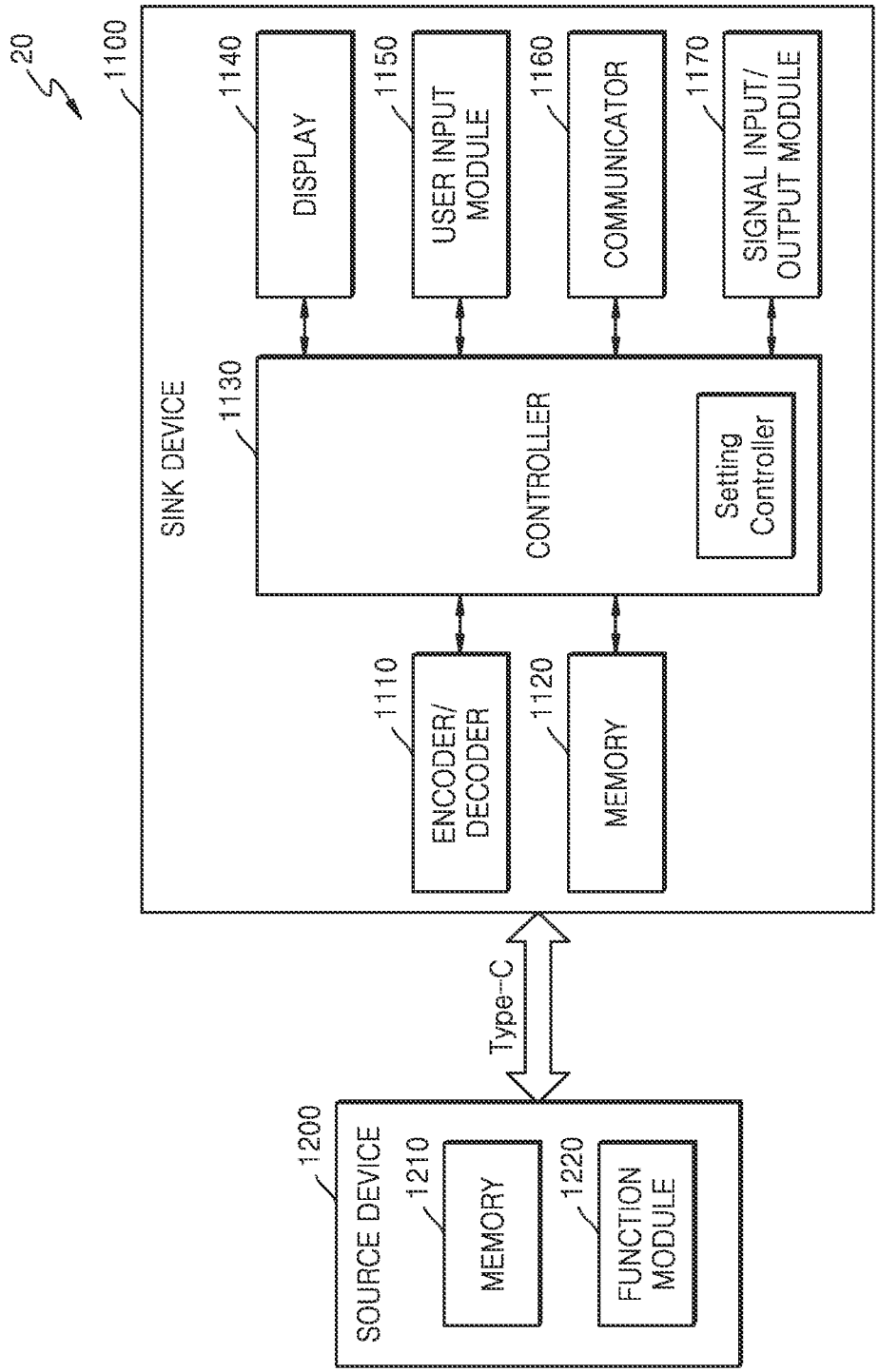
FIG. 13 is a block diagram illustrating a digital TV (DTV) system applied to the embodiments of the disclosure.

FIG. 13 is a block diagram illustrating a digital TV (DTV) system 20 applied to the embodiments of the disclosure.

Referring to FIG. 13, the DTV system 20 may include a DTV device 1100 and may also include an external device 1200 communicating with the DTV device 1100 according to a USB Type-C interface. In the DTV system 20, the DTV device 1100 may be referred to as a sink device and the external device 1200 storing content information may be referred to as a source device.

Each of the DTV device 1100 and the external device 1200 may include a connector (not shown) of a USB Type-C structure, and accordingly, the external device 1200 may be connected to the connector of the DTV device 1100 regardless of a direction. The external device 1200 may receive a command and an address from a controller 1130 included in the DTV device 1100 and may perform an operation indicated by the received command. For example, when a plurality of pieces of content information are stored in the memory 1210 of the external device 1200, an access operation may be performed on the content information indicated by an address.

The external device 1200 may be, for example, a flash memory-based storage device. The flash memory may include, for example, NAND flash memory, NOR flash memory, etc. The flash memory-based storage device may include, for example, a solid state drive (SSD), universal serial bus (USB)-based flash drive device, etc. The external device 1200 may be implemented as a removable drive. The external device 1200 may be implemented as a recording medium, such as a video compact disk (CD), a digital video disk (DVD), etc.

In an embodiment, the external device 1200 may store at least one multimedia file as content information. The multimedia file may mean a file including image data and audio data. Such multimedia files may be compressed in various formats, such as Moving Picture Experts Group (MPEG), Digital Video Express (DivX), etc.

The DTV device 1100 may be an electronic device that processes and reproduces content information (or bitstream). The content information may be a signal including video data and audio data provided from the external device 1200. Alternatively, the DTV device 1100 may be an electronic device that processes and reproduces a multimedia file selected by a user from among a plurality of multimedia files stored in the external device 1200. Here, the term "reproduction" may mean displaying an image according to processed video data, outputting audio according to processed audio data, or representing an image and audio according to the processed video data and audio data.

In an embodiment, the DTV device 1100 may include a decoder/encoder 1110, a memory 1120, a controller 1130, a display device 1140, a user input module 1150, a communicator 1160, and a signal input/output module 1170.

The decoder/encoder 1110 may decode an encoded bitstream provided from the controller 1130 and output decoded information. In an embodiment, the bitstream may be extracted from a plurality of multimedia files stored in the external device 1200. Alternatively, in another embodiment, the bitstream may be extracted from content information received from an external server or broadcasting station. However, the disclosure is not limited thereto.

Also, the decoder/encoder 1110 may encode content information, such as a multimedia file. In an embodiment, an encoding operation may be performed for a specific function, and as an example, a video thumbnail file including encoded frames may be generated through the encoding operation. An encoding method may be, for example, an MPEG format, but is not limited thereto.

The memory 1120 may read data or write data in response to the control by the controller 1130. For example, the memory 1120 may include a nonvolatile memory, store multimedia files provided from the external device 1200, and provide the stored multimedia files to the decoder/encoder 1110 based on the control by the controller 1130. Also, encoded information generated by the decoder/encoder 1110 may be stored in the memory 1120.

The controller 1130 may control the overall operation of the DTV device 1100. The controller 1130 may include a processor such as a central processing unit (CPU) and may further include a memory, such as a buffer, a register, etc. therein.

The controller 1130 may communicate with the external device 1200 of the disclosure according to a specific communication standard and may communicate with at least one other external device. For example, the controller 1130 may communicate with the external device 1200 of the disclosure according to a specific communication standard and at least one other device through at least one of various communication standards, such as a USB, a multimedia card (MMC), an embedded MMC (eMMC), a peripheral component interconnection (PCI), a PCI-express (PCI-E), an Advanced Technology Attachment (ATA), a Serial-ATA, a Parallel-ATA, a small computer system interface (SCSI), an enhanced small disk interface (ESDI), an Integrated Drive Electronics (IDE), a Firewire, a Universal Flash Storage (UFS), a WIFI, a Bluetooth, an NVMe, etc.

The display device 1140 may display an image based on the bitstream processed by the controller 1130, a decoded frame, a decoded multimedia file, etc. Also, the user input module 1150 may be a module provided to be manipulated by the user. The user input module 1150 may include various types of input interface related circuits. For example, the user input module 1150 may be implemented in various forms, such as a mechanical or electronic button of the DTV device 1100, a remote controller separated from a main body of the DTV device 1100, a touchpad, a touch screen, etc.

In an embodiment, the user input module 1150 may receive a selection signal indicating information selected by the user and transmit the selection signal to the controller 1130. The communicator 1160 may be a bidirectional communication circuit including at least one of components such as a communication module and a communication chip corresponding to various types of wired and wireless communication protocols, etc. The communicator 1160 may be implemented in various forms, for example, a Wi-Fi communication chip that performs Wi-Fi communication through an access point, a Bluetooth Low Energy (BLE) communication chip that performs BLE communication, a LAN card connected to a router or a gateway, etc.

The signal input/output module 1170 may serve as a communication interface. For example, the signal input/output module 1170 may transmit the content information processed by the controller 1130 to the outside. In an embodiment, the signal input/output module 1170 may include a transmitter and a receiver. In the present embodiment, the signal input/output module 1170 may transmit/receive a signal based on a HDMI transfer standard. The HDMI transfer standard has been released up to version 2.1.

According to an embodiment of the disclosure, the DTV device 1100 may execute various user environments provided by the external device 1200 based on a result of detecting the connection direction of the external device 1200. For example, even though the communicator 1160 is not provided in the DTV device 1100, when a module supporting wireless communication such as Wi-Fi is provided in the external device 1200, the user may connect the external device 1200 to the DTV device 1100 in a specific direction so that the communication module in the external device 1200 is enabled, and accordingly, the DTV device 1100 may perform wireless communication with another external device (or an external system). In addition, in setting access authority to the content information, such as multimedia files stored in the external device 1200, the user may connect the external device 1200 to the DTV device 1100 in a specific direction to differently set the access authority. For example, according to the access authority to the content information, modification and deletion of the content information may or may not be allowed, and a security function such as blocking transfer of the content information to an external system may be applied.

Figure 14:
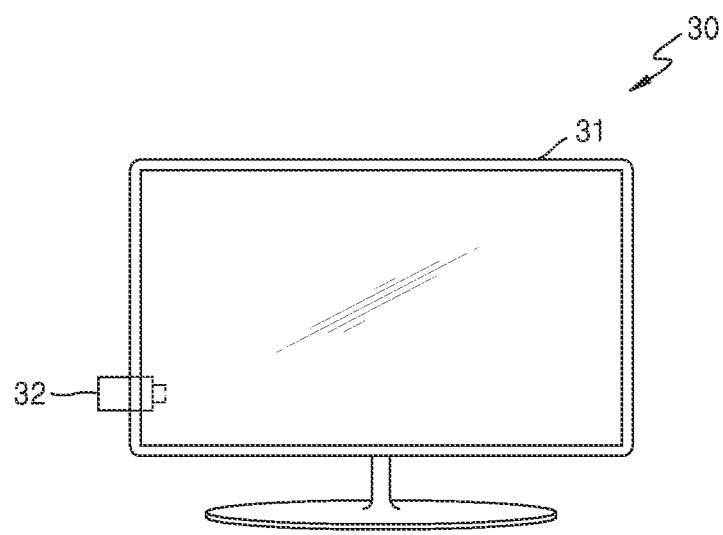
FIG. 14 is a diagram illustrating an implementation example of a system in an embodiment of the disclosure.

FIG. 14 is a diagram illustrating an implementation example of a system in an embodiment of the disclosure. In FIG. 14, a USB device according to the embodiments of the disclosure is mounted in the DTV device in the previous embodiment, and the system according to the embodiments of the disclosure will be applicable even when the USB device is mounted in various computing systems such as a smartphone, a tablet, a PC, etc.

As shown in FIG. 14, the DTV system 30 includes a DTV device 31 and a USB device 32, and each of the DTV device 31 and the USB device 32 may include a connector according to a USB Type-C interface. According to the embodiments described above, different user environments may be provided according to the direction in which the USB device 32 is connected to the DTV device 31, and the DTV device 31 may perform a control operation to set the operating environment of the USB device 32 based on the connection direction.

Alternatively, according to various embodiments, when the DTV device 31 provides information related to a connection direction to the USB device 32, the USB device 32 may perform a control operation for setting the operating environment of the DTV device 31. For example, the USB device 32 may recognize the connection direction of the USB device 32 based on various types of information provided from the DTV device 31 and the manufacturer, product, authentication status, etc. of the DTV device 31. You will be able to acquire various types of information related to system operation. Based on the embodiments described above, the USB device 32 may perform command transfer for configuration control of the DTV device 31.

Figure 15:
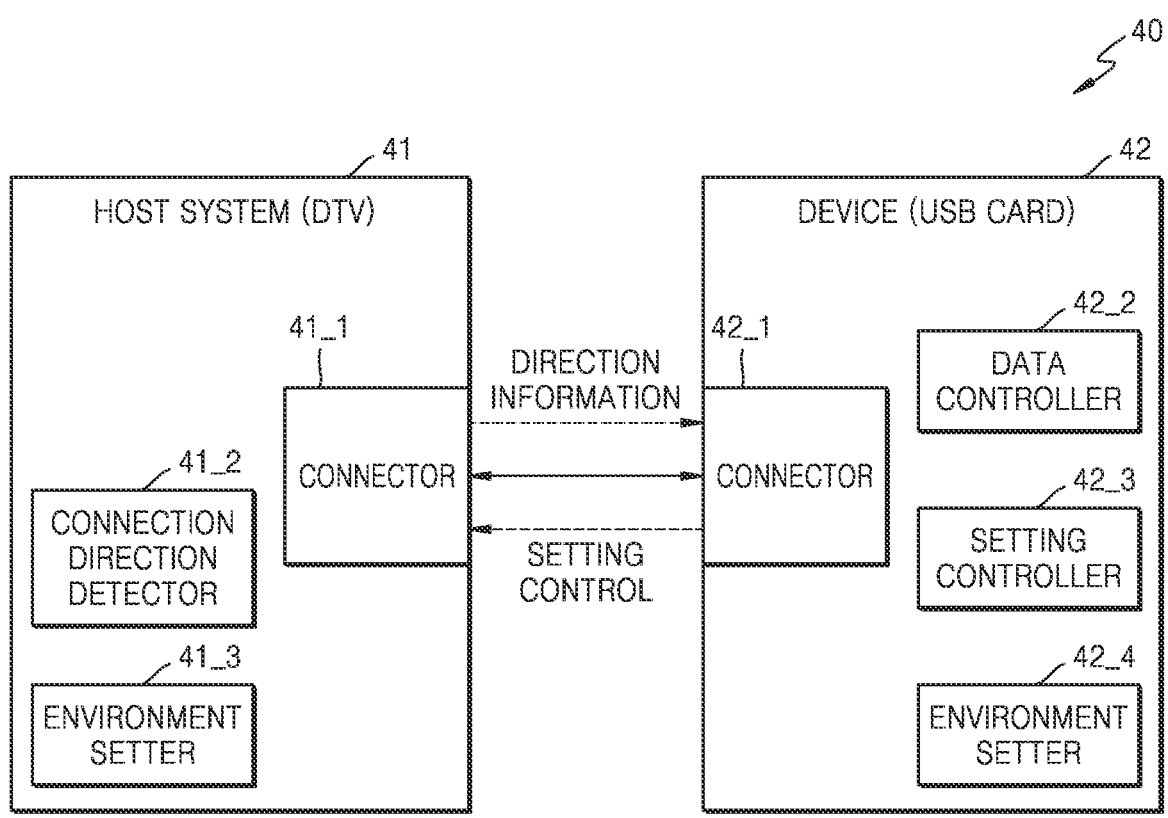
FIG. 15 is a block diagram illustrating an electronic system in which a device performs environment setting control on a host system, according to an embodiment of the disclosure.

FIG. 15 is a block diagram illustrating an electronic system 40 in which a device 42 performs configuration control on a host system 41, according to an embodiment of the disclosure.

Referring to FIG. 15, the electronic system 40 may include the host system 41 and the device 42 according to embodiments of the disclosure. As an example, the host system 41 may be various types of a data processing device such as a DTV device or a PC and the device 42 may be a device (e.g., a USB card) that stores data, such as a memory card. In defining the terms of the present embodiment, the DTV device or the PC may be defined as the host system 41 and the device 42 may be defined as a slave device, but this is only for convenience of description and the embodiment of the disclosure is not necessarily limited thereto. For example, in terms of data transmission and reception, when a subject that transmits data is defined as a host and a subject that receives data is defined as a slave, the DTV device or the PC may be referred to as a slave, and the device such as the memory card may also be referred to as a slave.

According to an embodiment, the host system 41 may include a connector 41_1, a connection direction detector 41_2, and an environment setter 41_3 and the device 42 may include a connector 42_1, a data processor 42_2, a setting controller 42_3, and an environment setter 42_4. A detailed description of the component illustrated in FIG. 1 among the components illustrated in FIG. 15 will be omitted.

As the device 42 provides a command to the host system 41 to control an operating configuration of the host system 41, the setting controller 42_3 may be a component included in a driver in the device 42. Also, the environment setter 42_4 may set the operating environment of the device 42 based on internal control of the device 42 and/or control according to the embodiments described above from the host system 41.

Meanwhile, in an embodiment, the device 42 may receive direction information from the host system 41 and perform configuration control on the host system 41 based on the received direction information. The host system 41 may perform a configuration operation based on various commands defined in a USB Type-C interface.

In an embodiment, the device 42 may perform a control operation for differently setting a security level to be allowed for the host system 41 and access authority with respect to information provided in the host system 41 through various types of information from the host system 41. For example, the device 42 may select any one of various settable operating environments based on various types of information from the host system 41 to transmit the selected one to the host system 41. Based on various conditions such as whether the host system 41 corresponds to an approved device, the device 42 may differently set encryption/decryption levels of data by the data processor 42_2, and the host system 41 may perform a configuration control operation to perform encryption/decryption operations of different levels. In addition, the host system 41 may store main information related to system operation therein and may differently set access authority with respect to the main information based on the configuration control operation of the device 42. In addition, based on the configuration control of the host system described in the above embodiments, the device may also perform a configuration control operation on the host system in the same or similar manner.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure. An aspect of an embodiment may be achieved through instructions stored within a non-transitory storage medium and executed by a processor.

While the disclosure has been particularly shown and described with reference to embodiments thereof, it will be understood that various changes in form and details may be made therein without departing from the spirit and scope of the following claims.

What is claimed is:

1. A host system for communicating with a device, the host system comprising:
   a connector having a structure configured to connect to the device irrespective of a direction, and comprising a plurality of pins disposed thereon;
   a connection direction detector configured to detect a direction in which the device is connected to the host system by detecting a signal from at least one first pin of the plurality of pins; and
   a setting controller configured to receive, from the device, setting information related to a configuration supported by the device and control a configuration operation on the device based on direction information from the connection direction detector, the direction information specifying the direction in which the device is connected to the host system,
   wherein the host system is configured to perform control such that
   a function of the device associated with transfer of data to or from the device is enabled in response to the device being connected to the host system in a first direction, and disabled in response to the device being connected to the host system in a second direction.

2. The host system of claim 1, wherein:
   the host system is configured to communicate with the device according to a universal serial bus (USB) Type-C interface, and
   the first pin comprises at least one of a configuration channel (CC)1 pin or a CC2 pin defined in the USB Type-C interface.

3. The host system of claim 2, wherein the connection direction detector is configured to detect a connection direction of the device based on detecting which pin of the CC1 pin and the CC2 pin is connected to a pull-down resistor defined in the USB Type-C interface.

4. The host system of claim 2, wherein:
   the host system comprises a configuration channel integrated circuit CCIC connected to each of the CC1 pin and the CC2 pin, and
   the connection direction detector is provided in the CCIC.

5. The host system of claim 2, wherein the setting controller is configured to receive the setting information from the device through a Get Descriptor operation defined in the USB Type-C interface.

6. The host system of claim 2, wherein the setting controller is configured to control the configuration operation on the device through a Set Configuration/interface operation defined in the USB Type-C interface.

7. The host system of claim 1, wherein the device comprises
   a nonvolatile memory device storing content information, and
   a communication module configured to perform wireless communication with an external system, wherein the function of the device associated with transfer of data to or from the device comprises the wireless communication, and
   wherein the host system is configured to enable the communication module in response to the device being connected to the host system in the first direction, and disable the communication module in response to the device being connected to the host system in the second direction.

8. The host system of claim 1, wherein the device comprises
   a nonvolatile memory device storing one or more pieces of content information, and
   an access authority control module configured to control access authority to the nonvolatile memory device, wherein the function of the device associated with transfer of data to or from the device comprises access to the content information, and
   wherein the host system is configured to enable access to the content information in response to the device being connected to the host system in the first direction, and disable access to the content information in response to the device being connected to the host system in the second direction.

9. The host system of claim 1, further comprising:
   a host controller configured to perform hardware communication with the device through the connector;
   an application configured to provide a request or data to the device; and
   a host driver configured to convert the request or the data from the application into a format corresponding to the device and to provide the request or the data to the host controller, wherein the setting controller is provided in the application or the host driver.

10. The host system of claim 9, wherein the direction information is provided to at least one of the application or the host driver, and the at least one of the application or the host driver uses the direction information to selectively enable or disable the function of the device associated with transfer of data to or from the device.

11. The host system of claim 1, further comprising a digital TV (DTV) comprising a display device, wherein the function of the device associated with transfer of data to or from the device comprises wireless communication by the DTV with an external system through a wireless communication module of the device.

12. An operating method of a host system communicating with a device, wherein the host system comprises a connector of a universal serial bus (USB) Type-C structure, the operating method comprising:
   detecting a direction in which the device is connected to the host system by detecting a signal from at least one first pin of a plurality of pins of the connector;
   receiving setting information related to a configuration supported by the device through a first control with respect to the device; and
   controlling, based on the setting information and the direction in which the device is connected to the host system, a configuration operation on the device through a second control with respect to the device, wherein controlling the configuration operation comprises
   enabling a function of the device associated with transfer of data to or from the device in response to the device being connected to the host system in a first direction, and
   disabling the function of the device associated with transfer or data to or from the device in response to the device being connected to the host system in a second direction.

13. The operating method of claim 12, wherein the first pin comprises at least one of a configuration channel (CC)1 pin or a CC2 pin defined in a USB Type-C interface, and the direction in which the device is connected to the host system is detected based on detecting which pin of the CC1 pin and the CC2 pin of the host system is connected to a pull-down resistor defined in the USB Type-C interface.

14. The operating method of claim 12, wherein the first control is performed through a Get Descriptor operation defined in a USB Type-C interface.

15. The operating method of claim 12, wherein the second control is performed through a Set Configuration/interface operation defined in a USB Type-C interface.

16. The operating method of claim 12, wherein the device comprises a nonvolatile memory device storing content information, and a communication module configured to perform wireless communication with an external system, wherein the function of the device associated with transfer of data to or from the device comprises the wireless communication, and wherein the host system is configured to enable the communication module in response to the device being connected to the host system in the first direction, and disable the communication module in response to the device being connected to the host system in the second direction.

17. The operating method of claim 12, wherein:

the host system further comprises an application and a host driver included in a software layer, and wherein direction information generated by detecting the direction in which the device is connected to the host system is provided to at least one of the application or the host driver.

18. A universal serial bus (USB) device communicating with a host system according to a USB Type-C interface standard, the USB device comprising:

a connector having a structure configured to connect to the host system irrespective of a connection direction and comprising a plurality of pins;

a nonvolatile memory device storing content information and configured to provide the content information to the host system based on a first control from the host system;

a function module configured to provide one or more user environments to the host system; and an environment setter configured to set an operating environment of the USB device based on a second control of the host system, wherein the environment setter is configured to disable a function of the function module associated with transfer of data to or from the USB device based on the second control in response to the USB device being connected to the host system in a first direction, and enable the function of the function module associated with transfer of data to or from the USB device based on the second control in response to the USB device being connected to the host system in a second direction.

19. The USB device of claim 18, wherein the second control comprises a Set Configuration/interface operation defined in the USB Type-C interface.

20. The USB device of claim 18, wherein:

the function module comprises a communication module configured to support wireless communication with a system other than the host system, wherein the function of the function module associated with transfer of data to or from the USB device comprises the wireless communication, and wherein, when the function of the function module associated with transfer of data to or from the USB device is enabled, the USB device is configured to provide wireless communication between the host system and the other system.

* * * * *